United States Patent [19]

Schrörs

[11] Patent Number: 4,996,862
[45] Date of Patent: Mar. 5, 1991

[54] FLEXURE-CONTROLLABLE ROLL HAVING HYDROSTATIC SUPPORTING ELEMENTS PROVIDED WITH PISTON/CYLINDER UNITS

[75] Inventor: Günther Schrörs, Tönisvorst, Fed. Rep. of Germany

[73] Assignee: Eduard Küsters Maschinenfabrik GmbH & Co KG, Krefeld, Fed. Rep. of Germany

[21] Appl. No.: 395,322

[22] Filed: Aug. 17, 1989

[30] Foreign Application Priority Data

Aug. 17, 1988 [DE] Fed. Rep. of Germany ....... 3827836

[51] Int. Cl.$^5$ ............................................ B21B 27/05
[52] U.S. Cl. ..................... 72/245; 29/116.1; 29/116.2; 100/162 B; 100/170
[58] Field of Search ................ 72/243, 245; 29/116.1, 29/116.2; 100/170, 162 B; 91/51, 166

[56] References Cited

U.S. PATENT DOCUMENTS

| | | | |
|---|---|---|---|
| 3,131,625 | 5/1964 | Küsters et al. | 29/116.2 |
| 3,994,367 | 11/1976 | Christ . | |
| 4,185,879 | 1/1980 | Hars et al. | 308/20 |
| 4,228,571 | 10/1980 | Biondetti | 29/116.2 |
| 4,299,162 | 11/1981 | Hartmann et al. | 100/43 |
| 4,328,744 | 5/1982 | Pav et al. | 100/162 B |
| 4,514,887 | 5/1985 | Rauf et al. | 29/116.2 |
| 4,726,691 | 2/1988 | Lehmann . | |
| 4,856,157 | 8/1989 | Küsters . | |

FOREIGN PATENT DOCUMENTS

| | | | |
|---|---|---|---|
| 225827 | 6/1987 | European Pat. Off. | 72/245 |
| 0252251 | 1/1988 | European Pat. Off. . | |
| 2432467 | 1/1976 | Fed. Rep. of Germany . | |
| 2725033 | 10/1981 | Fed. Rep. of Germany . | |
| 2557972 | 6/1982 | Fed. Rep. of Germany . | |
| 2942002 | 6/1982 | Fed. Rep. of Germany . | |
| 2943644 | 2/1988 | Fed. Rep. of Germany . | |
| 506979 | 8/1979 | U.S.S.R. | 72/245 |

OTHER PUBLICATIONS

Hydrostatische Stützquellen, Escher Wyss Mitteilungen 1/2 1980, pp. 33–39.

Primary Examiner—Lowell A. Larson
Assistant Examiner—T. C. Schoeffler
Attorney, Agent, or Firm—Kenyon & Kenyon

[57] ABSTRACT

A flexure-controllable roll includes a stationary crosshead extending through a hollow cylinder, which is rotatable about the crosshead and supported by hydrostatic supporting elements that are radially displaceable by at least one piston/cylinder unit associated with each supporting element. Hydraulic fluid flows from the cylinder chamber of each piston/cylinder unit via choke bores into supply pockets formed in the contact surface of each supporting element. An additional piston/cylinder unit is provided on the rear side of the supporting element for exerting additional forces directed either toward the supporting element to press it against the inner circumference of the hollow cylinder or away from the supporting element to pull it away from the inner circumference.

8 Claims, 2 Drawing Sheets

FLEXURE-CONTROLLABLE ROLL HAVING HYDROSTATIC SUPPORTING ELEMENTS PROVIDED WITH PISTON/CYLINDER UNITS

BACKGROUND OF THE INVENTION

The invention relates generally to rolls for treating webs of material and, more particularly, to an improved hydrostatically supported roll having a rotatable hollow cylinder, a crosshead extending lengthwise therethrough and supporting elements disposed in the clearance space between the cylinder and crosshead.

In DE-PS 2432467, a flexure-controllable roll is disclosed having a rotatable hollow cylinder forming a working roll circumference and a stationary crosshead extending lengthwise through the hollow cylinder to form a surrounding clearance space with the inner circumference of the hollow cylinder. At least one hydrostatic supporting element is guided in a cylinder bore in the crosshead. Choke bores lead from the cylinder chamber underneath the supporting element into supply pockets formed in the contact surface of the supporting element. The contact surface of the supporting element abuts the inner circumference of the hollow cylinder. A threaded member is provided in the base of the cylinder chamber and is adjustable in the axial direction of the cylinder chamber. The threaded member has an internal cylinder bore within which a small piston is slidably received. The small piston is connected to the supporting element by means of piston rod-like member such that when the supporting element moves into its cylinder bore in the crosshead, the small piston, in turn, is pushed into its cylinder bore. The cylinder chamber of the small piston is connected with the cylinder chamber under the supporting element by a conduit, which has a throttle valve for adjusting the cross sectional area of the conduit and, hence, the flow therethrough. In this manner, the small piston acts like a damping element because as the small piston moves with the supporting element hydraulic fluid must be either displaced from or drawn into its cylinder chamber depending upon the direction of movement. The force that the small piston exerts on the supporting element is directed only against one side of the supporting element for forcing the supporting element against the inner circumference of the hollow cylinder. Hence, the ability of the small piston to control the flexure of the roll accordingly is limited. Furthermore, the force exerted by the small piston is derived from the pressure in the cylinder chamber of the supporting element.

SUMMARY OF THE INVENTION

One of the problems to which the invention is directed is provision of a flexure-controllable roll in which the limited control disadvantage of prior rolls is avoided by providing more ways to control the flexure or bending of the roll.

The invention solves this problem by providing a flexure-controllable roll having a rotatable hollow cylinder forming a working roll circumference and a stationary crosshead extending lengthwise through the hollow cylinder to form a surrounding clearance space with an inner circumference of the hollow cylinder. The roll has at least one hydrostatic supporting element provided in a respective bore in the crosshead and at least one piston/cylinder unit associated with each supporting element for radially displacing its respective supporting element within its bore under the pressure of hydraulic fluid in the cylinder chamber of the piston/cylinder unit. A contact surface is formed on each supporting element for abutting the inner circumference of the hollow cylinder and fluid supply pockets are surrounded by the contact surface. Choke conduits connect the supply pockets with the cylinder chamber of each piston/cylinder unit. At least one additional piston/cylinder unit can be pressurized with hydraulic fluid separately from the piston/cylinder unit associated with each supporting element. Either the piston or cylinder of the additional piston/cylinder unit is connected to the supporting element, while the other of the piston and the cylinder is connected to the crosshead such that the additional piston/cylinder unit can exert forces, independently of the pressure of hydraulic fluid in the cylinder chamber of the piston/cylinder associated with the supporting element. In this manner, the forces produced by the additional piston cylinder unit may be directed either toward the supporting element to press it against the inner circumference of the hollow cylinder or away from the supporting element to pull it away from the inner circumference of the hollow cylinder.

The invention provides for greater control of the operating performance of the supporting element, as discussed in more detail subsequently, due to the forces that can be exerted on the supporting element by the additional piston/cylinder unit. These forces can be adjusted independently of the pressure in the cylinder chamber of the supporting element.

The additional piston/cylinder unit ma comprise a rear extension connected to the supporting element. The piston of the additional unit is connected to the rear extension. This piston is slidably received in a cylinder bore in the crosshead. Hydraulic fluid supply lines are provided for pressurizing the cylinder chambers disposed above and below the piston.

Another important aspect of the invention is the means for controlling the volume of hydraulic fluid to supply a constant volume of hydraulic fluid over time to the cylinder of the piston/cylinder unit associated with each supporting element. A system for controlling the volume of hydraulic fluid supplied to the supply pockets of a supporting element of a flexure-controllable roll is disclosed in EP 252251. In this disclosure, a volumetric pump supplies fluid to the supply pockets via chokebores. The cylinder chamber below the supporting element is enclosed and pressurized by a pressure-regulated hydraulic fluid, which supplies the total contact pressure.

In the present invention, however, the contact pressure is not generated separately from the volume-controlled hydraulic fluid, but rather is, for the most part, generated by the volume-controlled hydraulic fluid, which is supplied to the cylinder chamber underneath the supporting element for pressing the element against the inner circumference of the hollow cylinder. Only after this occurs does the hydraulic fluid flow into the supply pockets where it acts against the inner circumference of the hollow cylinder.

A roll constructed according to the invention can function using the following operating methods.

(a) When the additional piston/cylinder unit does not exert force in any direction and the movable part of the additional unit can move freely, the supporting element acts like an ordinary supporting element in the typical flexurecontrollable roll. The force exerted by the supporting element against the inner circumference of the hollow cylinder is controlled in the usual manner by regulating the pressure in the cylinder chamber below the supporting element. The size of the gap h between the contact surface of the supporting element and the inner circumference of the hollow cylinder, into which the hydraulic fluid from the supply pockets flows, remains essentially constant, even over varying pressures in the cylinder below the supporting element.

(b) If, when operating according to the aforementioned method, a force is exerted by the additional piston/cylinder unit that pulls the supporting element away from the inner circumference of the hollow cylinder, the force exerted by the supporting element accordingly decreases and the size of the gap h is changed. When the pressure in the cylinder chamber underneath the supporting element decreases, the force exerted by the supporting element also becomes smaller. However, in this case, the size of the gap h would remain essentially the same.

(c) If a constant volume of hydraulic fluid is supplied to the cylinder chamber underneath the supporting element, the pressure produced adjusts to a value determined by the discharge conditions. The pressure drop in the choke bore is constant for all line forces, that is to say for all pressures prevailing below the supporting element. The discharge conditions can be adjusted by the forces exerted by the additional piston/cylinder unit. If a supplementary force directed against the inner circumference is provided by the additional piston/cylinder unit, the gap h then becomes narrower and the force exerted by the supporting element against the inner circumference of the hollow cylinder increases. When a supplementary force provided by the additional piston/cylinder unit is directed away from the inner circumference, then the gap h becomes larger and the force decreases. The force exerted by the supporting elements can be controlled in this manner, in spite of the constantly supplied, volumetric flow of hydraulic fluid.

Use of a constant supply of hydraulic fluid is especially important when the hollow cylinder is heated from its interior by heating the hydraulic fluid. The amount of heat transmitted depends, first of all, on the total amount of heated hydraulic fluid that has been fed to the hollow cylinder. By keeping the volumetric flow constant, the amount of heat applied to the inside of the hollow cylinder and, consequently, the temperature of the hollow cylinder can thus be kept constant. In this manner, the pressure or rather the force exerted by the supporting elements and, thus, the line force distribution can be controlled independently of temperature by the forces provided by the additional piston/cylinder units.

In this connection, the size of the gap h likewise is important because additional heat is generated when hydraulic fluid flows through the narrow gap. These additional quantities of heat "of second order" can cause undesirable temperature fluctuations at the outer circumference of the hollow cylinder.

(d) If a roll is heated by the hydraulic fluid fed to the cylinder below the supporting element at a predetermined, increased temperature and if the pressure of this hydraulic fluid is controlled and the additional piston/cylinder unit exerts a constant force on the supporting element, then should a non-uniform temperature prevail along the length of the roll, the pressure drop in the restricted choke bore and, likewise, the size of the gap will depend on the temperature of the hydraulic fluid. This effect is due to the fact that viscosity depends upon temperature and the pressure drop in a choke bore depends upon viscosity.

(e) If, however, the choke bore in the heated roll is replaced by a restrictor mounted in the choke conduit, which functions independently of viscosity, and if a constant volume of hydraulic fluid then is supplied to the cylinder below the supporting element, then the line force can be controlled by the additional piston/cylinder unit exerting a force on the supporting element. In this manner, the size of the gap h advantageously remains constant over the length of the roll.

In this regard, the volume of hydraulic fluid that flows from the supporting element under different prevailing pressures is constant so that the principal quantity of heat transmitted in this manner to the hollow cylinder is constant. Furthermore, the gap size h and, consequently, the quantities of heat of the second order developing in the gap are constant and do not cause undesirable changes in the temperature profile along the hollow cylinder. With this operating method, the temperature distribution and the line force distribution can actually be controlled independently of each other to the greatest possible extent.

(f) In the case of rolls having an internal stroke in which the hollow cylinder is supported for radial movement as a whole relative to the crosshead, the additional piston/cylinder unit can be used to effect an alignment correction, when the rolls are closed to form a roll nip. If the roll nip previously had been opened to conduct a web therethrough, one end of the roll may not be abutting the counterroll or the web, in other words, the roll may be aligned at an angle. The alignment correction of the invention is achieved by the additional piston/cylinder unit of the supporting elements located at the ends of the hollow cylinder, which may exert a force against the inner circumference of the hollow cylinder. In this manner, the volume of hydraulic fluid that flows from diametrically opposed cylinder chambers of the additional piston/cylinder unit when the hollow cylinder shifts may be adjusted to equal values.

Other features, advantages and embodiments of the invention are apparent from consideration of the following detailed description, drawings and appended claims.

DETAILED DESCRIPTION

Figure 1:
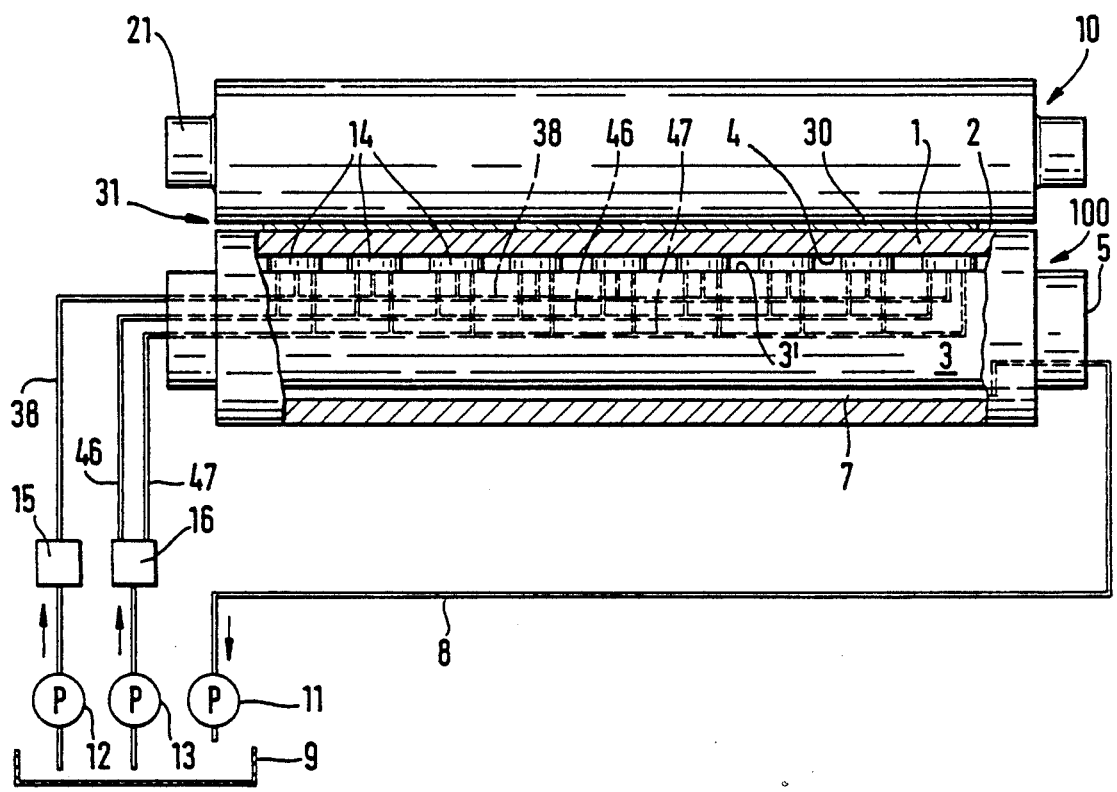
FIG. 1 schematically shows a longitudinal view of a pair of rolls in which the bottom roll, shown partly in section, is constructed according to the principles of the invention.

The pair of rolls depicted in FIG. 1 comprises a top roll 10 and a bottom roll 100, which together form a roll nip 31. A web of material 30 is conducted through the roll nip 3 for pressure treatment of the web 30. The top roll 10 may be a conventional solid roll, while the bottom roll 100 comprises a hydraulically supported roll having a rotatable hollow cylinder 1, whose outer circumference 2 forms the working roll circumference. A stationary crosshead 3 extends lengthwise through the cylinder 1 to form an annular clearance space with the inner circumference 4 of the hollow cylinder 1. This clearance space enables the crosshead 3 to bend inside the hollow cylinder 1 without coming into contact with the inner circumference 4. The hollow cylinder 1 may be supported at its ends by bearings (not shown) provided on the crosshead 3. In this case, the displacement of the crosshead 3 that occurs upon bending is confined to the inside of the hollow cylinder 1. However, in an alternative embodiment, which is designated by referring to the roll as having an "internal stroke", the hollow cylinder 1 can shift as a whole relative to the crosshead 3 in the active plane. In this design, the hollow cylinder 1 is not supported by bearings provided on the crosshead 3, but rather is supported by an arrangement that allows for guided radial movement of the crosshead 3, as a whole, in the active plane. The crosshead displacement in this type of support arrangement refers to the guided radial movement, which is superimposed by the bending of the crosshead.

The journals 21 of the top roll 10, as well as the ends 5 of the crosshead 3 protruding from the ends of the hollow cylinder 1, are secured in a cylinder stand or similar support (not shown).

Figure 2:
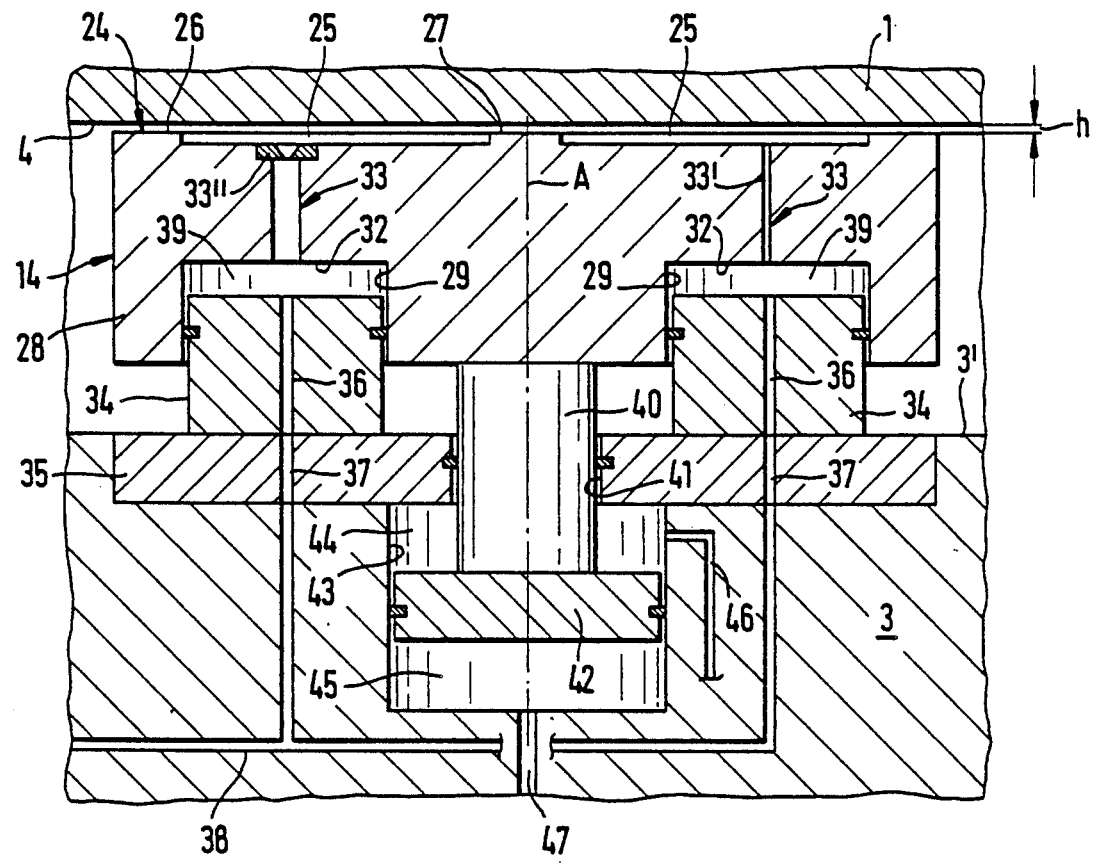
FIGS. 2 and 3 illustrate respective embodiments of a supporting element of the invention shown in longitudinal cross sectional views taken in a plane coincident with the axis of the roll.
Figure 3:
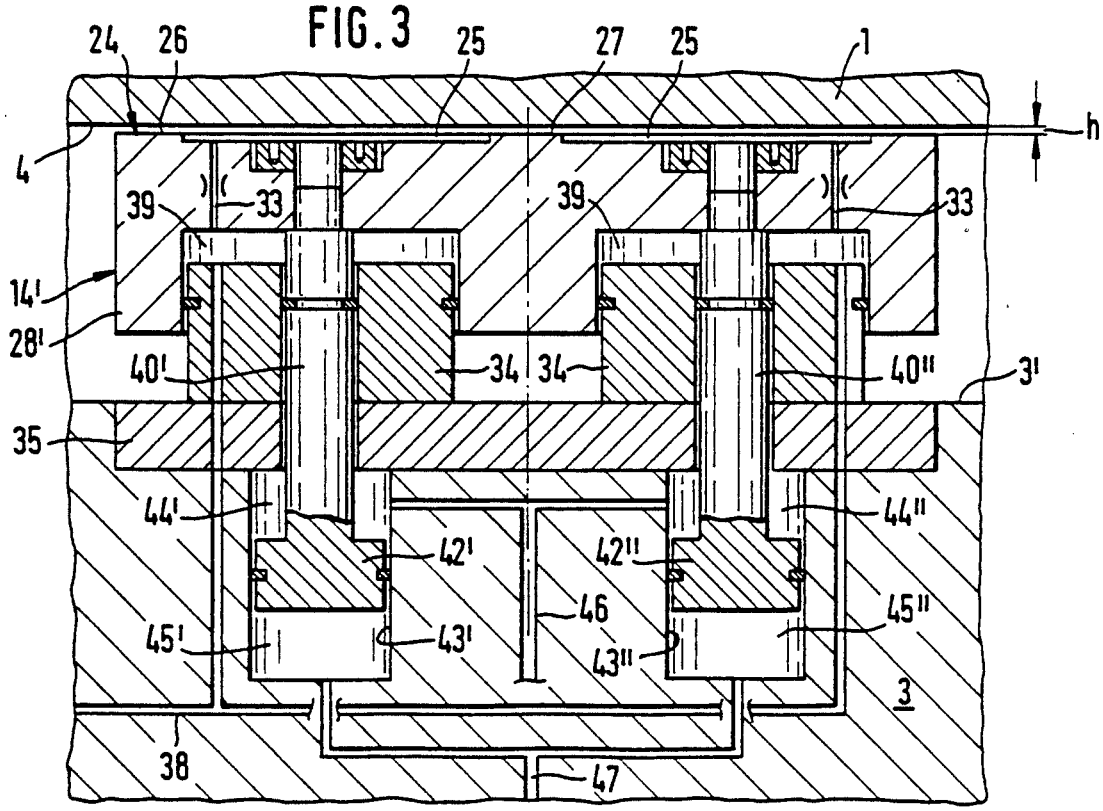

On the top side 3' of the crosshead 3 adjacent the roll nip 31, several (nine in the specific embodiment depicted) hydraulic supporting elements 14, distributed over the length of the hollow cylinder 1, are provided. Each of the supporting elements 14 has a contact surface 4 having a shape adapted to conform the inner circumference 4 of the hollow cylinder 1 for abutting the inner circumference 4. As shown in FIGS. 2 and 3, flat hydraulic supply pockets 25 are formed in the contact surface 24. Supply pockets 25 take up a considerable portion of the surface area of the contact surface 24 such that all that remains of surface 24 is boundary segments. In the embodiment shown, the supporting element 14 has a longitudinal axis A and a circular cross sectional shape. The contact surface 24 includes a boundary segment 26, which surrounds the entire circumference of the support element, and a center boundary segment 27 such that two, more or less, disk-shaped supply pockets 25 are formed in the contact surface.

The supporting element 14 is formed from a member 28, which comprises a thick, cylindrical member normally disposed with clearance above the top side 3' of the crosshead 3. In the bottom side of member 28, two cylindrical bores 29 are formed, as apparent in FIG. 2. The cylindrical bores 29 extend from the bottom of member 28 to a base surface 32, from where a choke conduit 33 emanates. Choke conduit 33 is connected to the respective supply pocket 25 disposed above it. The choke conduit 33 can be designed as a narrow bore 33', which maintains its small cross sectional area over its entire length, as shown on the right-hand side of FIG. 2. However, the choke conduit 33 also may be formed as a bore having a relatively large cross section and a restrictor 33" disposed at only one location in the conduit, as shown on the left-hand side of FIG. 2. The embodiment having the restrictor is mostly independent of viscosity so that even when widely varying hydraulic fluid temperatures prevail, the choke effect remains essentially the same.

According to FIG. 2, pistons 34, each having a piston seal, are provided in the cylinder bores 29. Pistons 34 are secured to a plate 35 embedded in the top side 3' of the crosshead 3. The pistons 34 and plate 35 have respectively aligned throughholes 36 and 37, which are connected between a supply line 38 and the cylinder chamber 39 located above the respective piston 34, for supplying the chamber 39 with hydraulic fluid.

On the bottom side of the member 28 a cylindrical extension 40 sealingly extends through a bore 41 in the plate 35. On the lower end of extension 40 a piston 42 is provided, which is sealingly disposed for movement in a cylindrical bore 43 provided in the crosshead 3. The piston 42 subdivides the cylinder bore 43 into a cylinder chamber 44 disposed on the piston rod-side of the chamber and a cylinder chamber 45 disposed below piston 42. Chambers 44 and 45 are connected to supply lines 46 and 47, respectively, formed in the crosshead 3.

The supporting element 14 functions in the following manner: If hydraulic fluid is supplied to the cylinder chambers 39 via the supply line 38, the contact surface 24 of supporting element 14 presses against the inner circumference 4 of the hollow cylinder 1. Via choke conduits 33, hydraulic fluid from the cylinder chambers 39 flows into the supply pockets 25 and, in its corresponding cross section, exerts a pressure against the inner circumference 4. The hydraulic fluid is constantly supplied via the supply line 38 and flows over the boundary segments 26,27 of the supply pockets to form in these areas a load-bearing liquid film. Thus, the supporting plunger 14 abuts the inner circumference 4 via a liquid layer. Should the gap h between the contact surface 24 and the inner circumference 4 widen due to the pressure in the supply pockets 25, then more hydraulic fluid can flow over the segments 26,27 and the pressure in the supply pockets 25 immediately diminishes because the subsequent supply of hydraulic fluid from the cylinder chambers 39 is throttled. As a result of this drop in pressure, the size of the gap h is again reduced and, at a predetermined pressure in the cylinder chamber 39, an equilibrium condition having a specific value of h occurs.

The function of the additional piston/cylinder unit 42,43 connected to the supporting element 14 is described below. By means of unit 42,43, additional forces can be exerted on the supporting element 14, independent of the hydraulic fluid supplied to the cylinder chambers 39 via the supply line 38. When the upper cylinder chamber 44 is pressurized via the line 46, the supporting element 14 is pulled away from the inner circumference 4 of the hollow cylinder 1. When the cylinder chamber 45 is pressurized via the line 47, the supporting element 14 is pressed against the inner circumference 4.

The hydraulic system for pressurizing the supporting elements 14 is schematically shown in FIG. 1. The pump 12 draws in hydraulic fluid from the supply tank 9 and supplies it via controlling system 15 and supply line 38 to the individual supporting elements 14. To affect the line pressure distribution along the length of the roll, groups of supporting elements 14 or even each one of the supporting elements 14, can be separately pressurizable. The line 38, although schematically shown only as a single line, in practice, may comprise several lines leading to groups of supporting elements or to individual supporting elements. Different pressures are supplied to these lines via the controlling System 15, which may include suitable regulatory valving in a manner known in the art. A special feature of the controlling system 15 is its ability to regulate volume, i.e., to supply a constant volumetric flow of hydraulic fluid over time to the individual supporting elements 14 or to the groups of supporting elements.

The pump 13 likewise draws in hydraulic fluid from supply tank 9 and supplies it via a controlling system 16 either to the supply line 46 or to the supply line 47. Via these lines the hydraulic fluid is supplied to the chambers of the additional piston/cylinder units 42,43 of the individual supporting elements 14. In the controlling system 16, the hydraulic fluid is adjusted via suitable regulatory valving to a specific pressure in a manner known in the art. The supply lines 46 and 47 also may be multiple lines, which can be used to pressurize groups of supporting elements 14 or individual supporting elements 14.

The hydraulic fluid supplied to the individual supporting elements via line 38 flows over the edge of the supporting elements 14 and into the clearance space 7 between the crosshead 3 and the inner circumference 4 of the hollow cylinder 1. From clearance space 7, the fluid is recirculated via the line 8 and the pump 11 to the supply tank 9.

The supporting element 14' of FIG. 3 corresponds substantially to the supporting element 14 of FIG. 2 and, similar parts of each embodiment bear the same reference numerals. The only difference between embodiments is that member 28' of element 14' does not have a central extension. Instead, two extensions 40', 40" are provided coaxial with the cylinder chambers 39. Pistons 42', 42", provided on the ends of the extensions, are slidably disposed in cylinder bores 43',43", respectively. The upper cylinder chambers 44',44" are jointly connected to the supply line 46, while the lower cylinder chambers 45',45" are jointly connected to the supply line 47. The function and operation of the supporting element 14' is the same as that of the supporting element 14 described above.

In the depicted embodiments, two individual pistons 34 are provided to support the supporting element 14 or 14', respectively. These pistons 34 have a diameter of only one third to one fourth the diameter of the supporting elements 14,14'. Instead of the two pistons 34, three or four pistons 34 can be provided or a single annular piston concentric to the axis A can be provided, in which case the cylinder bore 29 would likewise be formed as an annular-shaped recess. Additionally, the pistons 42',42" of FIG. 3 also could be replaced by an annular piston.

What is claimed is:

1. A flexure-controllable roll having a rotatable hollow cylinder forming a working roll circumference and a stationary crosshead extending lengthwise through the hollow cylinder to form a surrounding clearance space with an inner circumference of the hollow cylinder, said roll comprising:
   at least one hydrostatic supporting element provided in a respective bore the crosshead;
   at least one piston/cylinder unit associated with each supporting element for radially displacing its respective supporting element within its bore under the pressure of hydraulic fluid in a cylinder chamber of said at least one piston/cylinder unit;
   a contact surface formed on each supporting element for abutting the inner circumference of the hollow cylinder, said contact surface surrounding at least one fluid supply pocket formed therein;
   at least one choke conduit connecting said at least one supply pocket with the cylinder chamber of said at least one piston/cylinder unit;
   at least one additional piston/cylinder unit pressurizable with hydraulic fluid separately from the piston/cylinder unit associated with each supporting element, one of said piston and cylinder of said at least one additional piston/cylinder unit being connected to the supporting element and the other of said piston and cylinder being connected with the crosshead such that said at least one additional piston/cylinder unit can continuously exert forces, independently of the pressure of hydraulic fluid in the cylinder chamber of said at least one piston/cylinder unit associated with said at least one supporting element, directed either toward said at least one supporting element to press it against the inner circumference of the hollow cylinder or away from said at least one supporting element to pull it away from the inner circumference of the hollow cylinder.

2. The roll of claim 1 wherein said one of said piston and cylinder of said at least one additional piston/cylinder unit comprises a rear extension having a piston and said other of said piston and cylinder comprises a cylinder bore in the crosshead receiving said piston, and further comprising hydraulic fluid supply lines for pressurizing cylinder chambers formed in the cylinder bore above and below said piston.

3. The roll of claim 1 further comprising means for controlling the volume of hydraulic fluid supplied to the cylinder of the piston/cylinder unit associated with each supporting element.

4. The roll of claim 2 further comprising means for controlling the volume of hydraulic fluid supplied to the cylinder of the piston/cylinder unit associated with each supporting element.

5. The structural system of claim 1 wherein said at least one fluid supply pocket comprises first and second fluid supply pockets disposed one behind the other in a direction parallel to the longitudinal extent of the hollow cylinder, and said at least one choke conduit comprises first and second choke conduits with said first choke conduit connecting said first supply pocket with the cylinder chamber and said second choke conduit connecting said second supply pocket with the cylinder chamber.

6. The structural system of claim 2 wherein said at least one fluid supply pocket comprises first and second fluid supply pockets disposed one behind the other in a direction parallel to the longitudinal extent of the hollow cylinder, and said at least one choke conduit comprises first and second choke conduits with said first choke conduit connecting said first supply pocket with the cylinder chamber and said second choke conduit connecting said second supply pocket with the cylinder chamber.

7. The structural system of claim 3 wherein said at least one fluid supply pocket comprises first and second fluid supply pockets disposed one behind the other in a direction parallel to the longitudinal extent of the hollow cylinder, and said at least one choke conduit comprises first and second choke conduits with said first choke conduit connecting said first supply pocket with the cylinder chamber and said second choke conduit connecting said second supply pocket with the cylinder chamber.

8. The structural system of claim 4 wherein said at least one fluid supply pocket comprises first and second fluid supply pockets disposed one behind the other in a direction parallel to the longitudinal extent of the hollow cylinder, and said at least one choke conduit comprises first and second choke conduits with said first choke conduit connecting said first supply pocket with the cylinder chamber and said second coke conduit connecting said second supply pocket with the cylinder chamber.

* * * * *

UNITED STATES PATENT AND TRADEMARK OFFICE
CERTIFICATE OF CORRECTION

PATENT NO. : 4,996,862

DATED : March 5, 1991

INVENTOR(S) : Günter Schrörs

It is certified that error appears in the above-identified patent and that said Letters Patent is hereby corrected as shown below:

Column 2, line 30, should read
--The additional piston/cylinder unit may comprise a-- line 67, should read
--flexure-controllable roll.--

In Column 4, line 60, change "roll nip 3" to read
--roll nip 31--

Signed and Sealed this

Eleventh Day of August, 1992

Attest:

DOUGLAS B. COMER

*Attesting Officer*  *Acting Commissioner of Patents and Trademarks*